455-608 AU 233 EX

FIP8106 XR 3,584,221

X5322Y

[11] 3,584,221

[72] Inventor Motoaki Fi
Tokyo, Jap

[21] Appl. No. 787,031

[22] Filed Dec. 26, 1968

[45] Patented June 8, 1971

[73] Assignee Nippon Electric Company, Limited
Tokyo, Japan

[32] Priority Dec. 29, 1967

[33] Japan

[31] 42/85148

[54] POLARIZATION AND TIME DIVISION LIGHT MULTIPLEX COMMUNICATION SYSTEM
2 Claims, 1 Drawing Fig.

[52] U.S. Cl. 250/199, 350/157

[51] Int. Cl. H04b 9/00

[50] Field of Search 250/199; 331/94.5; 350/147, 150, 154, 157, 159, 160

Cited

UNITED STATES PATENTS

| | | | |
|---|---|---|---|
| 3,284,632 | 11/1966 | Niblack et al. | 250/199 |
| 3,430,048 | 2/1969 | Rubinstein | 250/199 |
| 3,435,226 | 3/1969 | Rack | 250/199 |
| 3,453,559 | 7/1969 | Sharp et al. | 331/94.5 |

*Primary Examiner*—Benedict V. Safourek
*Attorney*—Hopgood and Calimafde

ABSTRACT: A multiplexed light pulse communication system is described wherein light pulses of different phase and polarization orientations are combined and then subjected to selective polarization variations in response to pulse code modulated signals. The polarization varied light pulses are then amplitude modulated by passing them through a birefringent prism. A receiver for the detection of the thus transmitted amplitude modulated light pulse signals is described to recover the pulse code modulated signals.

PATENTED JUN 8 1971 3,584,221
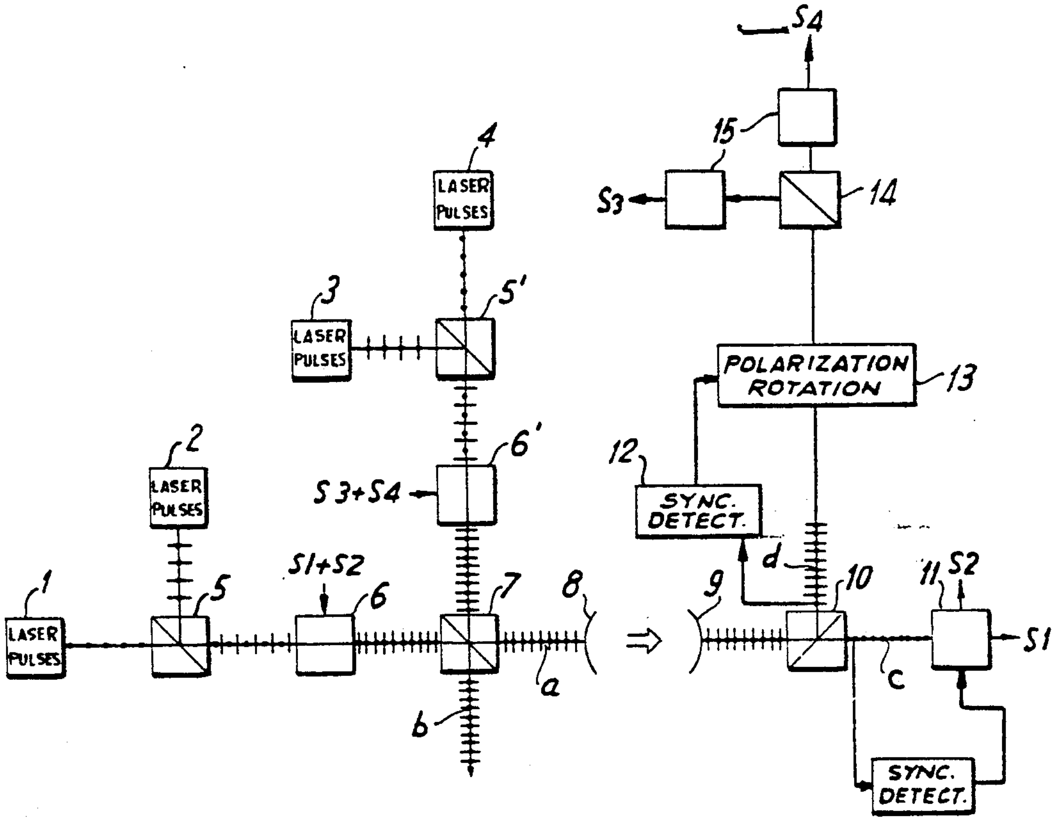
INVENTOR.
MOTOAKI FURUKAWA
BY
Hopgood & Calimafde
ATTORNEYS

POLARIZATION AND TIME DIVISION LIGHT MULTIPLEX COMMUNICATION SYSTEM

This invention relates to a multiplex light pulse communication system.

More specifically, this invention relates to a multiplexed light pulse communication system wherein selective polarization techniques are employed whereby a simple transmission and detection system is obtained.

In this invention, pairs of light carrier waves are subjected to selective rotation of the plane of polarization in synchronization with information signals by means of polarization-plane rotating elements and then time multiplexed into a single light-transmitting beam by a birefringent prism. At a receiving site, the transmitted light beam is separated into separate light beams by a birefringent prism, with each of the light beams being further separated to reproduce the transmitted information signal.

It is therefore an object of this invention to provide a simple multiplexed light communication system.

The above mentioned and other features and objects of this invention and the manner of attaining them will become more apparent and the invention itself will best be understood by reference to the following description of an embodiment of the invention taken in conjunction with the accompanying drawings, the description of which follows.

The FIGURE is a schematic diagram of a multiplex light communication system according to this invention.

Referring to the drawing, the reference numerals 1, 2, 3 and 4 designate devices for respectively generating carrier light wave linearly polarized light beams, which when viewed in the time domain produce pulse trains at an ultrahigh repetition rate with predetermined timing and phase differences with respect to one another. Thus the light pulses from source 1 are both different in phase as well as in polarization from the light pulses produced by source 2.

The pair of light pulse beams from devices 1 and 2 have mutually perpendicular planes of polarization and are incident upon a birefringent prism 5. Another pair of light beams with mutually perpendicular planes of polarization are supplied from the devices 3 and 4 and are incident upon another birefringent prism 5'. The output beams from the birefringent prisms 5 and 5' are then respectively applied to light modulators in the form of polarization-plane rotating elements 6 and 6', which respectively rotate the planes of polarization of the light beams in response to Pulse Code Modulated (PCM) signals $S_1+S_2$ and $S_3+S_4$, respectively. These signal pulses $S_1$, $S_2$, $S_3$ and $S_4$ occur in synchronization with the light pulses from sources 1, 2, 3 and 4 respectively. The operation of the pulses $S_1$ and $S_2$ on the modulator 6 is opposite to that of each other in that the pulses $S_1$ representing a "one" do not cause a change in the polarization whereas the pulses $S_2$ representing a "one" cause a 90° polarization change. The $S_1$ pulses representing a "zero" cause a 90° polarization change while the $S_2$ pulses representing a "zero" do not cause a polarization change. This opposite effect on the modulator is repeated with the pulses $S_3$ and $S_4$. The light beam subjected to the polarization-plane rotation by the element 6 is divided by a birefringent prism 7 into two pulse trains *a* and *b* having mutually perpendicular planes of polarization. Similarly, the light beam from the prism 5' is subjected to polarization-plane rotation at the modulator 6' and divided into two components by the prism 7. If the light beam pulses from the source 1 that are not rotated by the element 6 take the light path *a* after passing through the prism 7, the pulse train attributable from the device 1 and traveling along the path *a* have a one-to-one correspondence to the electrical pulse train $S_1$. On the other hand the light beam pulses transmitted along the light path *b* after passing through the prism 7 have a negative one-to-one correspondence to the electrical pulse train $S_1$ because the light pulse is absent when the pulse train $S_1$ is existent, and vice versa.

Since the PCM signal $S_2$ controls the element 6 in the opposite manner to the case of pulse signal $S_1$, the $S_2$ light pulsed rotating component takes the light path *a* after passing through the prism 7 and thus is in one-to-one correspondence to the electrical pulse train $S_2$, and its nonrotating component takes the light path *b* with negative correspondence to the pulses $S_2$. The light beam amplitude-modulated pulses produced in response to the electrical pulses $S_2$ and transmitted along either the path *a* or *b* have a plane of polarization in parallel with that of the light beam amplitude-modulated pulses produced in response to the electrical pulses $S_1$ and also follow the same path, with preservation of the phase difference between the light pulses from the sources 1 and 2.

In a similar manner the polarized light beam supplied from the device 3 has its polarization-plane rotated by PCM pulses $S_3$ in modulator 6' and the light beam supplied from the device 4 has its polarization-plane rotated by PCM pulses $S_4$ in modulator 6'. The light beam supplied from the devices 3 and 4 is likewise each divided by prism 7 into two pulse trains, along the light paths *a* and *b*.

It should be understood that the planes of polarization of the light beam amplitude-modulated pulses emerging from the prism 7 and traveling along the same path are identifiable in that the pulse signals $S_1$ and $S_2$ (abbreviated to $S_1$ light beam and $S_2$ light beam) have a plane of polarization that is perpendicular to that of the light beams amplitude-modulated in response to the electrical pulse trains $S_3$ and $S_4$ (abbreviated to $S_3$ light beam and $S_4$ light beam).

These light beams are transmitted to a receiving station from a transmitting antenna 8 through a transmission path. Each of the light beams received at a receiving antenna 9 is divided by means of a birefringent prism 10 into two light beams *c* and *d* having mutually perpendicular planes of polarization, which then follow the light paths *c* and *d*, resepctively. In the drawing, $S_1$ light beam and $S_2$ light beam follow the light path *c* and are respectively demodulated to $S_1$ and $S_2$ PCM pulses by means of a device 11 composed of a light detector and a demodulator operating in synchronism with the predetermined timing of transmitted pulse as determined by a sync detector 12.

$S_3$ and $S_4$ light beams following the path *d* are respectively demodulated to $S_3$ and $S_4$ by means of a device 11' which includes a polarization demodulator 13 controlled by a sync detector 12', a birefringent prism 14 and light detectors 15. The devices 11 and 11' may be composed of similar elements.

It is to be noted here that each of the electrical signals $S_1$, $S_2$, $S_3$, and $S_4$ for controlling the elements 6 and 6' need not necessarily be single information signals but may be multiplexed signals in themselves. For example, if $S_1$ is a multiplexed signal including *n* information signals $S_{11}$, $S_{12}$, .................., and $S_{1n}$, $S_1$ light beam contains those *n* information signals, which are demodulated by the device 11 as the signal $S_1$ and separated into the original information signals $S_{11}$, $S_{12}$, ............., and $S_{1n}$.

Since the light beams passing through the light path *b* are in a negative one-to-one correspondence to the transmitting signals, the signals $S_1$, $S_2$, $S_3$ and $S_4$ are separately obtained from such path by constructing the communication system including the transmitting and receiving antennas 8 and 9, a birefringent prism 10 as in the case of the light beam transmitted along the path *a*, and a device composed of a light detector and two demodulators operating in synchronism with the predetermined timing of transmitted light beam and also comprise a circuit for converting the negative correspondence into a positive one.

The multiplex light communication system according to the invention makes it possible to simply and effectively multiplex a number of carrier linearly polarized light beams.

While the principles of the invention have been described in connection with specific apparatus, it is to be clearly understood that this description is made only by way of example and not as a limitation to the scope of the invention as set forth in the objects thereof and in the accompanying claims.

I claim:

1. A multiplex light communication system comprising: a transmitter including means for producing a plurality of pairs of light beams of mutually perpendicular planes of polarization, each beam including a light pulse train of a predetermined repetition rate; a corresponding plurality of first birefringent prisms for respectively synthesizing each of said pairs of light beams into a single light beam; means for subjecting each of said synthesized light beams to selected rotation of their respective planes of polarization in response to pulse-code-modulated signals applied to said light beam rotation subjecting means, a second birefringent prism in optical communication with said light beam rotation subjecting means for converting said polarization-plane rotated light beams into two amplitude-modulated light pulse trains along differently oriented paths, and a receiver in the optical communication path of said transmitter and positioned to respond to one of said modulated light pulse trains and having a third birefringent prism for dividing the received light beam into two light beams having mutually perpendicular planes of polarization; and means for demodulating said divided light beams to reproduce said pulse-code-modulated signals.

2. The communication system of claim 1, in which said modulation signals each comprise first and second signals occurring in respective synchronism with said light pulse trains, said beam rotation subjecting means including means for rotating the polarization plane of said light beam by one sense for a given value of said first signal and for a different sense for said given value of said second signal.